UNITED STATES PATENT OFFICE.

WILLIAM POUNTNEY, OF BROOKLYN, NEW YORK.

IMPROVEMENT IN MANUFACTURE OF CRUET-BOTTLES.

Specification forming part of Letters Patent No. 56,263, dated July 10, 1866.

*To all whom it may concern:*

Be it known that I, WILLIAM POUNTNEY, of the city of Brooklyn, county of Kings, State of New York, machinist, have invented certain new and useful Improvements for Forming and Shaping the Necks of and Lips of Cruet-Bottles and in the mold for forming the bottle-stopper; and I do hereby declare that the following is a full and exact description of my said improvement, reference being had to the drawings accompanying and making part of this my specification.

My invention has reference to the forming and producing the part of the neck of the cruet-bottle which receives the stopper so as to make all of a uniform and equal size, which is the first and primary object or part of my invention, the second part having reference only to the construction of the mold in which the stopper is formed.

In the process of making the necks of the cruet-bottles as heretofore performed by glass-blowers the necks have been made of various sizes, and required a great deal of grinding and stoppering to make them fit.

My invention is intended to obviate these difficulties by an apparatus or tool which shall make the necks of a uniform size and tapered to fit the stopper. I also make the peg of the stopper round, without a seam on the sides in a cylinder bottom of a mold, with a plunger or plug to push up the stopper when pressed by a lever, all which I accomplish in the following-described manner and by the tool or apparatus and mold now to be described.

In the accompanying drawings, Figure I is a side view of the tool or apparatus for forming the neck as it appears before being closed or shut upon the neck to form it. Fig. II is the same with the tool closed or shut upon the neck. Fig. III is an end or top view of Fig. I; Fig. IV, the same of Fig. II. Fig. V is a vertical cross-section of the stopper-mold. Fig. VI is a surface view of the under side or bottom of the same. Fig. VII is a side view of the cruet and stopper when finished.

In all the figures the same letters represent the same parts.

A A, Figs. I, II, is an iron spring, bent so as to bring the two ends near to each other, and tempered so as to be elastic at the curve, and formed toward the ends to receive the jaws or formers B B, for which purpose they are semicircular for a part of their length, and the jaws are fitted into the semicircular part and fastened there by rivets. The parts A A are of size to be easily grasped and held in the hand. These parts in Fig. I are shown at rest, and in Fig. II are pressed together by the hand, the curved part being elastic, so as to fly back to its position at rest, as in Fig. I, when the pressure of the hand is relaxed.

C is a cross pin or rod passing through the two arms A A and having its ends turned up with a head or upset upon a washer, so that the two arms A A will work freely upon it, at the same time preventing the arms from spreading apart beyond the space desired.

A rotary spindle, D, extends from the bottom of curved part A A, which it passes through, and is held in place by a nut on the opposite side at *d*, and the opposite end of D passes through the rod *c*, and upon the end, after passing through *c*, is the tapered mandrel or plunger E and lip-former G, in one piece. This plunger is made of the size and tapering shape required for the neck of the cruet. The lip-former G is semicircular or convex on the side where it joins the plunger, as seen at G, Fig. II, and the semicircular part is made of a size and shape to suit the size of the neck and lip required.

The jaws B B are made concave or semicircular on their inner faces, as seen in Fig. IV; B B, so that when brought together by the grasp of the hand the concave parts will embrace and press the neck of the bottle between them and the plunger E.

The operation of the tool or apparatus is as follows: The cruet having been blown into form in the mold is then with the neck straight, the lips being unformed. The neck is then reheated to a plastic state. The workman, holding the tool in one hand, slides with the other hand the neck of the cruet over the plunger E and down upon the convex surface of the former G. By pressing gently the cruet upon the former G the edge or rim of the neck is caused to turn up at the sides and down at the end of the former, as in Fig. VII, so as to form the cruet-mouth, and immediately that the mouth is formed the two jaws are brought together upon the neck of the cruet by the closing of the hand, and at the same instant a rapid rotary motion back and forth is given by the other hand to the cruet, by which the neck is formed and compressed upon the plunger E or mandrel and finished, and all the necks and mouths of the cruets made upon the same tool are of uniform size and shape.

The second part of my invention consists in constructing the stopper-mold with a movable bottom or plug, Fig. V, where H H is the mold, I the chamber in which the stopper peg is molded of the size required. K is the movable bottom or plug; L, a lever hung under the mold, so that by working the exterior arm of the lever the interior arm will raise and lower the sliding bottom or plug.

The manner of operating is as follows: The molten glass is pressed into the chamber I so as to fill it, the sliding bottom having been first fixed in its required place. As soon as the stopper has become congealed so as to harden, the sliding bottom is thrown up by the lever and the stopper is thus easily removed. The sliding bottom is immediately replaced in the required position, and the chamber again filled.

I do not claim as my invention the tool or apparatus consisting of the parts A B independently by themselves, nor do I claim the former G separately by itself; but

What I claim as my invention, and for which I desire Letters Patent, is—

1. The combining the plunger E and lip and mouth-former G, made or united in one piece, with the jaws B B, the said part G having a rotary motion with the cruet-bottle back and forth, arranged and operating substantially in the manner and for the purposes described.

2. The combining and uniting the lip and mouth-former with the neck-former or plunger in one piece.

3. The construction of the stopper-mold with a sliding bottom, plunger, or plug to push up the stopper by pressing with a lever, combined and operating in the manner and for the purposes described.

W. POUNTNEY.

Witnesses:
WILLIAM H. FIELD,
J. B. STAPLES.